United States Patent [19]

Ohta

[11] Patent Number: 4,564,860

[45] Date of Patent: Jan. 14, 1986

[54] METHOD AND SYSTEM OF MEASURING IMAGE AREA

[75] Inventor: Toshio Ohta, Ibaragi, Japan

[73] Assignee: Komori Printing Machinery Co., Ltd., Tokyo, Japan

[21] Appl. No.: 575,047

[22] Filed: Jan. 30, 1984

[30] Foreign Application Priority Data

Jan. 31, 1983 [JP] Japan ................................. 58-13894

[51] Int. Cl.$^4$ ............................................. H04N 7/18
[52] U.S. Cl. .................................................. 358/107
[58] Field of Search ................................... 358/107, 93

[56] References Cited

U.S. PATENT DOCUMENTS 3,958,509  5/1976  Murray et al. ................... 358/107 X

FOREIGN PATENT DOCUMENTS 32-73608  5/1957  Japan .

Primary Examiner—Howard W. Britton
Assistant Examiner—Victor R. Kostak
Attorney, Agent, or Firm—Blakely, Sokoloff, Taylor & Zafman

[57] ABSTRACT

In a method and system of measuring an image area, a solid portion corresponding to a portion having a 100% dot ratio in offset printing is formed in a margin of a printing plate, and a blank portion corresponding to a portion having a 0% dot ratio in offset printing is also formed in the margin of the printing plate. Electrical signals obtained from the solid and blank portions are used as reference values for 100% and 0% dot ratios, respectively. Electrical signals obtained from an image bearing portion of the printing plate are converted to image area percentage data in accordance with these reference values irrespective of a nonuniform surface density of the printing plate.

3 Claims, 16 Drawing Figures

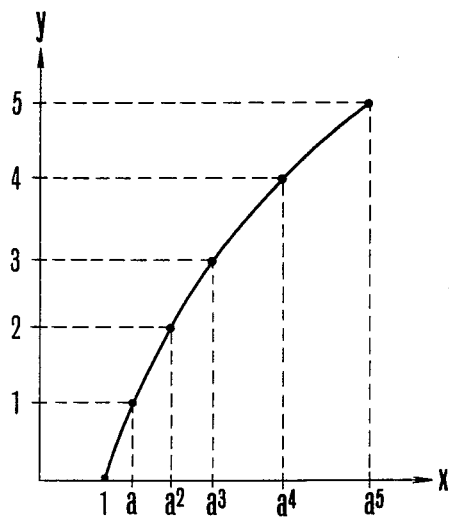
F I G.15
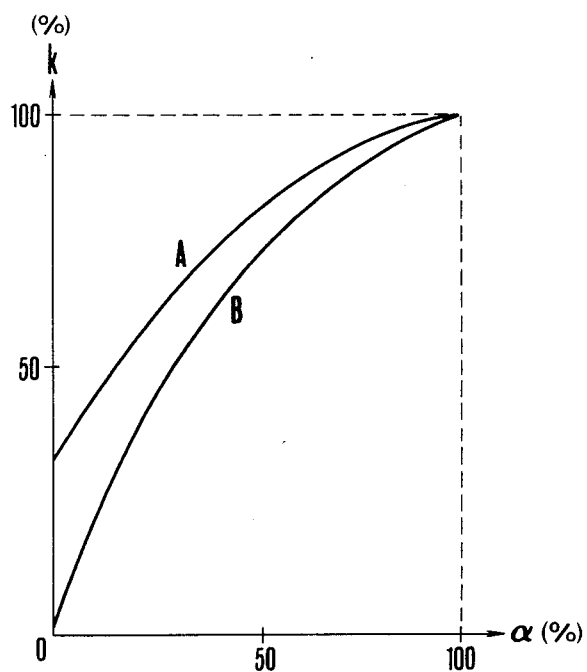
F I G.16

METHOD AND SYSTEM OF MEASURING IMAGE AREA

BACKGROUND OF THE INVENTION

The present invention relates to a method and system of measuring an image area of a lithographic printing plate of an offset printing press or the like.

In order to determine the quantity of ink supplied to a printing plate at the time of printing, an image area of the printing plate is conventionally divided into a plurality of zones, and an image area percentage of each zone is measured. Recently, a method is adopted wherein light irradiates the surface of the printing plate, and the image area of each zone is measured in accordance with an electrical signal corresponding to the quantity of light reflected by this zone.

In an image area measuring means disclosed in Japanese Patent Disclosure No. 57-73608, an output signal obtained by reflected light from a blank portion is given to correspond to a 0% dot ratio, and an output signal obtained by reflected light from a solid portion is given to correspond to a 100% dot ratio. By using these ratios as references, intermediate output values are converted to corresponding area percentages, respectively. In practice, a maximum output value for a blank portion is used as a reference for 0% dot ratio, and a minimum output value for the overall area of the printing plate is given as a reference for 100% dot ratio.

However, in the means described above, since the printing plate comprises an aluminum plate roughened by graining, coated with a sensitizer and applied with a gum arabic solution, a surface density becomes nonuniform due to a nonuniform graining, and nonuniform application of the sensitizer or gum arabic. When the maximum and minimum outputs are given to be references for 0% and 100% dot ratios, respectively, an error occurs due to the nonuniform density. It is, therefore, impossible to properly measure the area over the entire surface of the printing plate, resulting in inconvenience.

SUMMARY OF THE INVENTION

It is, therefore, an object of the present invention to provide an effective method of accurately measuring an image area, wherein an error due to a nonuniform density of a surface of a printing plate can be completely eliminated.

It is another object of the present invention to provide a system of measuring an image area in accordance with the method described above.

According to an aspect of the present invention, there is provided, in an image area measuring apparatus of the type wherein an image bearing surface of a lithographic printing plate is divided into a plurality zones and photographed with a television camera to produce an analog image signal which is converted into a digital signal to obtain a measured value, the image area of each zone is calculated based on the measured value and a quantity of printing ink supplied at the time of printing to the lithographic printing plate is determined according to the image area, a method of measuring an image area of the lithographic printing plate, comprising the steps of:

forming a solid portion and a blank portion in a margin defining the image bearing surface of the lithographic printing plate, the solid and blank portions corresponding to portions having 100% and 0% dot ratios, respectively;

defining a first average value of electrical signals obtained from the solid portion to be a first reference value for the 100% dot ratio, and a second average value of electrical signals obtained from the blank portion to be a second reference value for the 0% dot ratio; and converting electrical signals from the image bearing surface to area percentage data in accordance with the first and second reference values.

BRIEF DESCRIPTION OF THE DRAWINGS

FIG. 15 is a graph showing the characteristic of the correction table; and

FIG. 16 is a graph showing the characteristic of the conversion table.

DESCRIPTION OF THE PREFERRED EMBODIMENT

The printing plate was divided at equal intervals along the vertical direction (top to bottom) and the lateral direction (right to left). The densities at the intersections of the matrix were measured. It was found that variations in density occur along the vertical and horizontal directions.

Figure 1:
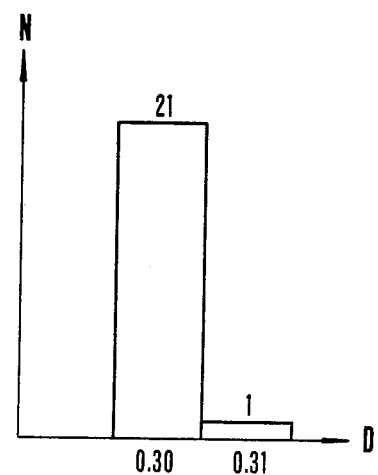
FIGS. 1 and 2 are graphs showing nonuniform densities of a printing plate so as to explain the principle of the present invention.
Figure 2:
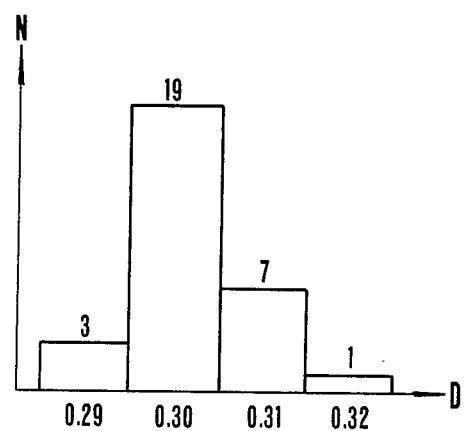

FIG. 1 shows the relationship between an average value D of the densities of the laterally aligned points and the number N of times of occurrence of the value D. FIG. 2 shows the relationship between an average value D of the densities of the vertically aligned points and the number N of times of occurrence of the value D. As is apparent from FIGS. 1 and 2, variations in the densities of the laterally aligned points are greater than those of the vertically aligned points.

The above result is caused by a manufacturing process of a printing plate. In the manufacture of a printing plate, a sensitizer is coated to a roll material which is then cut into raw plates. An image is formed on each raw plate which is then coated with a gum arabic solution. During this process, nonuniform pressure and coating tend to occur along the lateral direction of the roll. Nonuniformity tends not to occur at the central portion of the printing plate. However, nonuniformity tends to occur at the right and left end portions in a symmetrical manner.

A solid portion corresponding to a portion having 100% dot ratio is formed in any portion of a margin of a printing plate, and a blank portion corresponding to a portion having 0% dot ratio is formed in an entire lateral portion of the margin which corresponds to at least one of lateral image portions. When electrical signals obtained from the solid and blank portions are obtained and averaged, the image area measurement can be properly performed even if a nonuniform density occurs on the surface of the printing plate.

Figure 3:
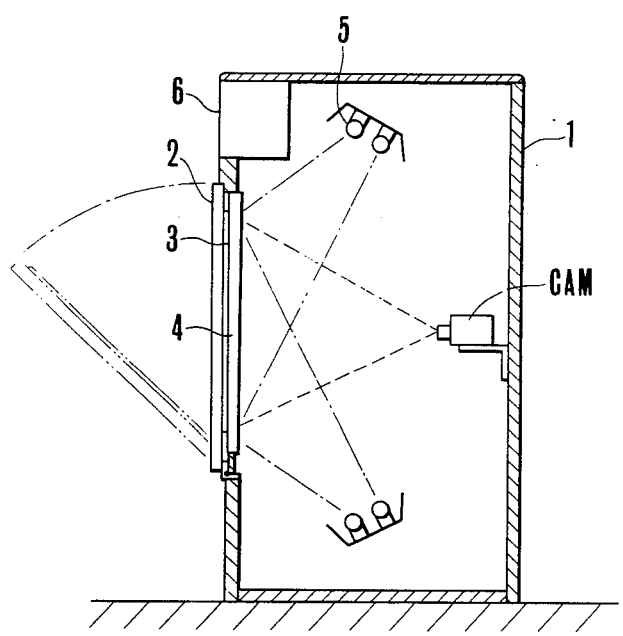
FIG. 3 is a sectional view showing the image pick up unit.

FIG. 3 and the subsequent figures show a system of measuring an image area according to an embodiment of the present invention on the basis of the assumption described above. FIG. 3 is a sectional view of an image pickup unit. A camera box 1 has an openable lid 2 on one side. A lithographic printing plate 3 is positioned on the inner surface of the camera with a guide pin, not shown, with its image bearing surface faced inside. When the lid 2 is closed the lithographic printing plate 3 is clamped between a transparent plate 4 made of glass or the like and the lid 2 in a flat state.

Light sources 5 in the form of fluorescent lamps or the like which opposes the transparent plate 4 is disposed at vertical locations or at vertical and horizontal locations with respect to the plate 4. Accordingly, the image bearing surface of the lithographic printing plate 3 is photographed by a television camera CAM (hereinafter merely called a camera) having solid state photoelectric converting elements which are arranged in a matrix.

An operating plate 6 is positioned above the lid 2 for supporting a display cathode ray tube, switch groups including display lamps, a keyboard for inputting a code, and such output devices as a printer, a magnetic card mechanism or the like.

Figure 4:
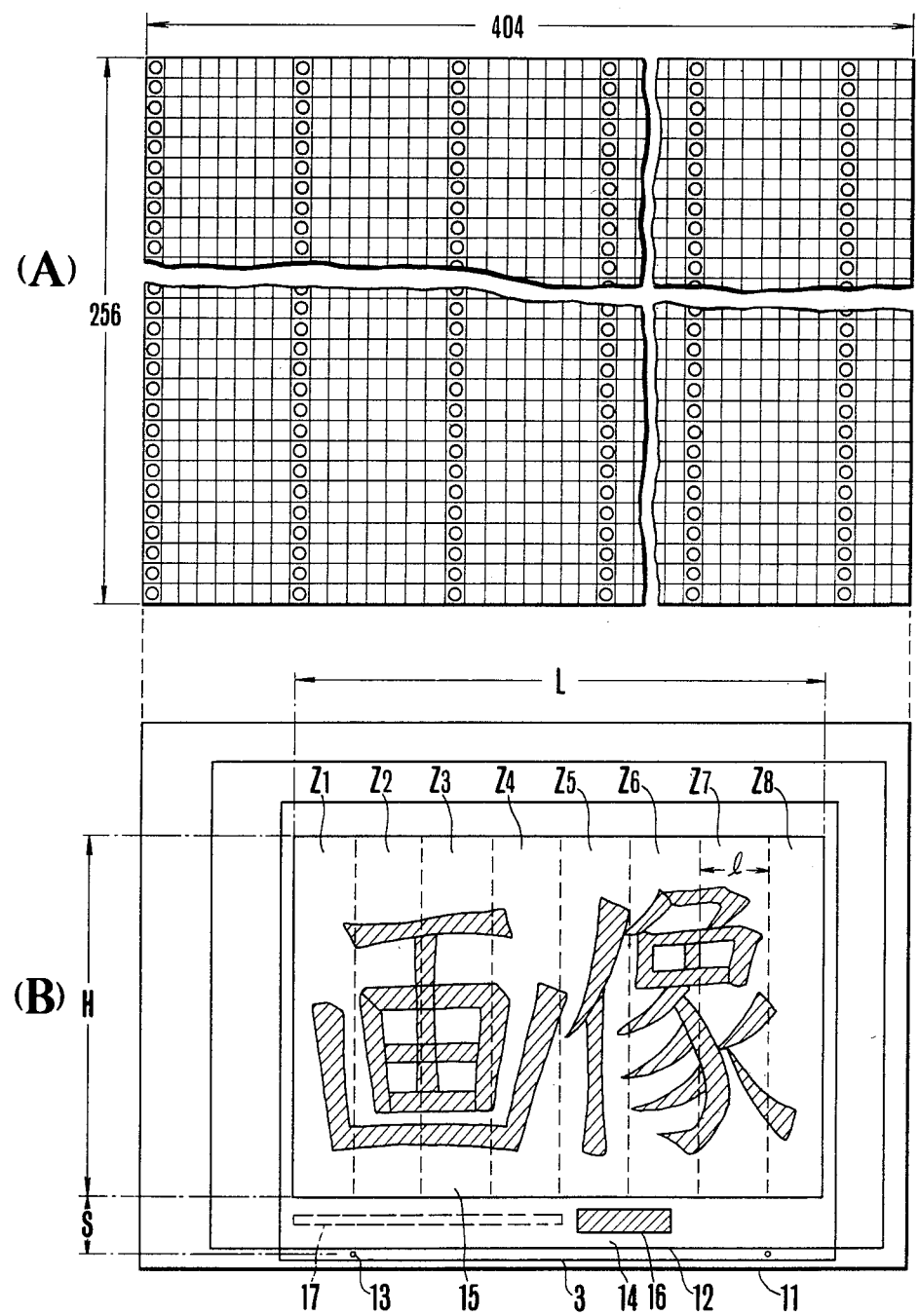
FIG. 4(A) is a front view showing groups of solid state image pick up elements of a camera.
FIG. 4(B) shows the inner side of a lid of the image pick up unit.

FIG. 4A shows the solid state photoelectric converting element groups and FIG. 4B shows the inner side of the lid 2.

The solid state photoelectric converting element groups are arranged in a matrix consisting of 404 rows and 256 columns to cover an area 11 to be photographed. The area 12 to be actually photographed, however, is determined to be smaller than area 11. The lithographic printing plate 3 is positioned in the actual photographing area 12 by guide pins 13.

The lithographic printing plate 3 has a peripheral margin so that a portion to be actually printed is only the image bearing surface 15 having a width L and a height H. The spacing between the guide pins 13 and the lower edge of the image bearing surface 15 is denoted by S. However it shoud be understood that these dimensions differ depending upon the size of the lithographic printing plate 3.

In this example, the image bearing surface 15 is divided into a plurality of zones $Z_1$ to $Z_8$ each having a width of l. Corresponding thereto, the solid state photoelectric converting elements are apparently divided into groups in the horizontal direction, each including 8 elements, so that the sampling operation for deriving out image signals from the solid state photoelectric converting elements can be made sequentially and repeatedly for each groups according to the order of arrangement of the elements in the horizontal direction.

A solid portion 16 corresponding to a portion having 100% dot ratio in offset printing is formed in any part of the right lateral portion of the margin 14 of the printing plate 3 and has an area greater than an image pixel. A blank portion 17 corresponding to a portion having 0% dot ratio in offset printing is formed in the entire left lateral portion of the margin 14 of the printing plate 3 so as to correspond to the left-side image bearing surface 15.

The solid portion 16 and the blank portion 17 may be formed in the upper margin 14 if they fall within the range of the area 12 to be actually photographed. Alternatively, one of the solid and blank portion 17 may be formed along the entire lateral portion of the margin which corresponds to the entire image bearing surface 15.

Figure 5:
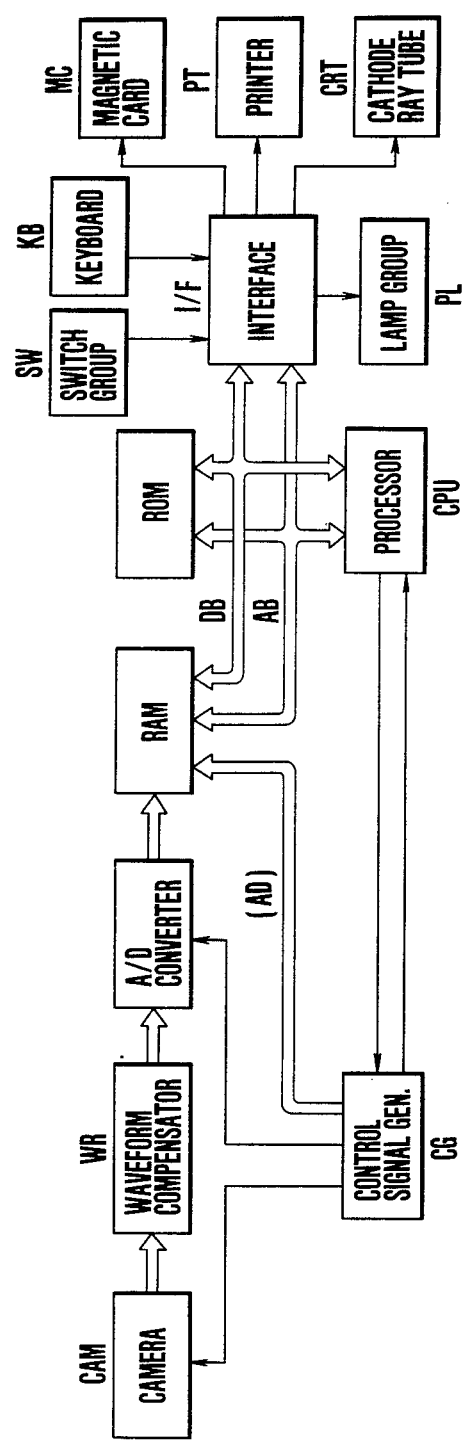
FIG. 5 is a block diagram of an electric circuit.

FIG. 5 is a block diagram of an electric circuit including the camera CAM. The crest value of the image signal from the camera is compensated for by a waveform compensator WR to be described later. The corrected signal is converted into a digital signal by an analog/ digital converter A/D containing a sample/-hold circuit. The digital signal that is the measured value is stored in a RAM.

The content of the RAM is read by such processor CPU as a microprocessor. The processor CPU executes a predetermined arithmetic operation based on the read out content to determine the image area of each of the zones $Z_1$ to $Z_8$ thus determining ink supply quantity for each zone. The ink quantity signal thus determined is sent to a magnetic card mechanism MC, a printer PT and a cathode ray tube CRT via an interface I/F.

The operation of the camera CAM is controlled by a synchronizing signal from a control signal generator CG. In response to a sampling pulse generated by the control signal generator CG, the A/D converter performs sample/hold and conversion. The RAM is also supplied with an address designation signal from the control signal generator CG so as to sequentially store the output of the A/D converter.

The processor CPU executes predetermined arithmetic operation and control operation according to an instruction stored in the ROM. The CPU is also operated in accordance with instructions from a switch group SW and a keyboard KB via the interface I/F and turns ON and OFF a lamp group PL to display the operation state.

The processor CPU also gives a start signal to the control signal generator CG. When the camera CAM photographs a lithographic printing plate a termination signal is given to the processor CPU from the control signal generator CG, whereby the processor CPU starts its arithmetic operation.

Figure 6:
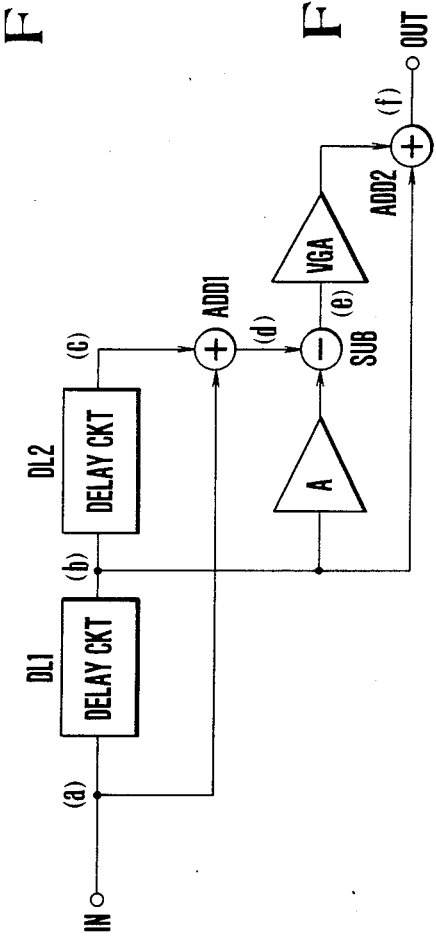
FIG. 6 is a block diagram showing a waveform compensating circuit.
Figure 7:
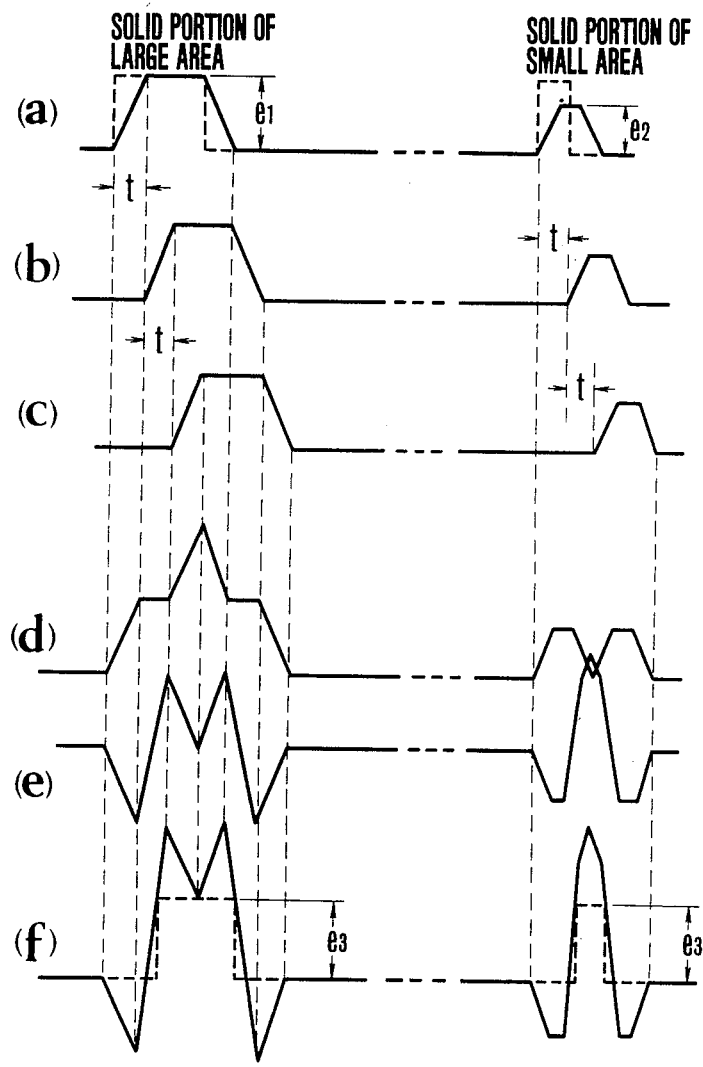
FIG. 7 is a timing chart showing waveforms at various portions of the electric circuit.

FIG. 6 is a block diagram of a waveform compensator WR, and FIG. 7 is a timing chart showing waveforms at various portions of the circuit shown in FIG. 6. In FIG. 7 showing the waveforms at various portions of the waveform compensator WR shown in FIG. 6 a portion corresponding to 100% dot ratio of the image (hereinafter called a solid portion) and having a suficiently large area and corresponding signal waveforms are shown on the left, and signal waveforms corresponding to a solid portion having a small area are shown on the right.

Where a solid portion having a size shown by broken lines in FIG. 7a is photographed, an image signal shown by solid lines in FIG. 7a is produced. An image signal corresponding to a solid portion having a sufficiently large area rises with a build up time t and builds down with a similar build down time. Such waveform has a crest value $e_1$ corresponding to the reflectivity of the solid portion.

On the other hand, an image signal corresponding to a solid portion having a small area builds down before it rises sufficiently due to the transient characteristic of the camera CAM so that such image signal will have a crest value $e_2$ smaller than $e_1$.

Where an image signal (a) is inputted to an input terminal IN shown in FIG. 6 an output signal shown in FIG. 7f can be obtained from an output terminal OUT. This means that even an image signal corresponding to a solid portion having a small area is converted into a signal having a sufficiently large crest value.

More particularly, in FIG. 6, first and second delay circuits $DL_1$ and $DL_2$ each having a delay time equal to the build up time t are connected in series. The image signal (a) inputted to the input terminal IN is delayed by the delay circuit $DL_1$, and its delayed output (b) is further delayed by the delay circuit $DL_2$ to produce an output (c).

The input to the delay circuit $DL_1$, i.e., the image signal (a) and the output (c) of the delay circuit $DL_2$ are added together with a first adder $ADD_1$ to obtain an output (d) which is applied to a subtractor SUB. The output of an amplifier A is equal to twice of the output (b). In the subtractor SUB the output (d) is subtracted from the output of the amplifier A at a ratio of 2:1 to obtain an output (e).

The output (e) is applied to a second adder $ADD_2$ via a variable gain amplifier VGA to be added to the output (b). If the gain of the variable gain amplifier VGA is 1, the second adder $ADD_2$ produces an output (f).

Although the output (f) contains a waveform distortion caused by the arithmetic operation, a waveform as shown by broken lines in FIG. 7 can be obtained, if high pass frequency components are removed in a succeeding transmission system. Consequently, a waveform corresponding to a solid portion having a sufficiently large area and a waveform corresponding to a solid portion having a small area would have substantially the same crest value $e_3$.

Consequently, irrespective of the area, an image signal having a crest value corresponding to the solid portion can be obtained, thus eliminating any measurement error.

Depending upon the degree of compensation, the delay times of the delay circuits $DL_1$ and $DL_2$ may be determined to lie in a range of 0.5 to 1.5 times of the build up time t. In the same manner, the gain of the variable gain amplifier VGA can be determined in accordance with the degree of the waveform compensation.

The same object can be achieved by omitting the amplifier A and by providing a coefficient applicator which applies a coefficient 0.5 on the output side of the adder $ADD^1$. In a certain case, the variable gain amplifier VGA may be omitted.

Figure 8:
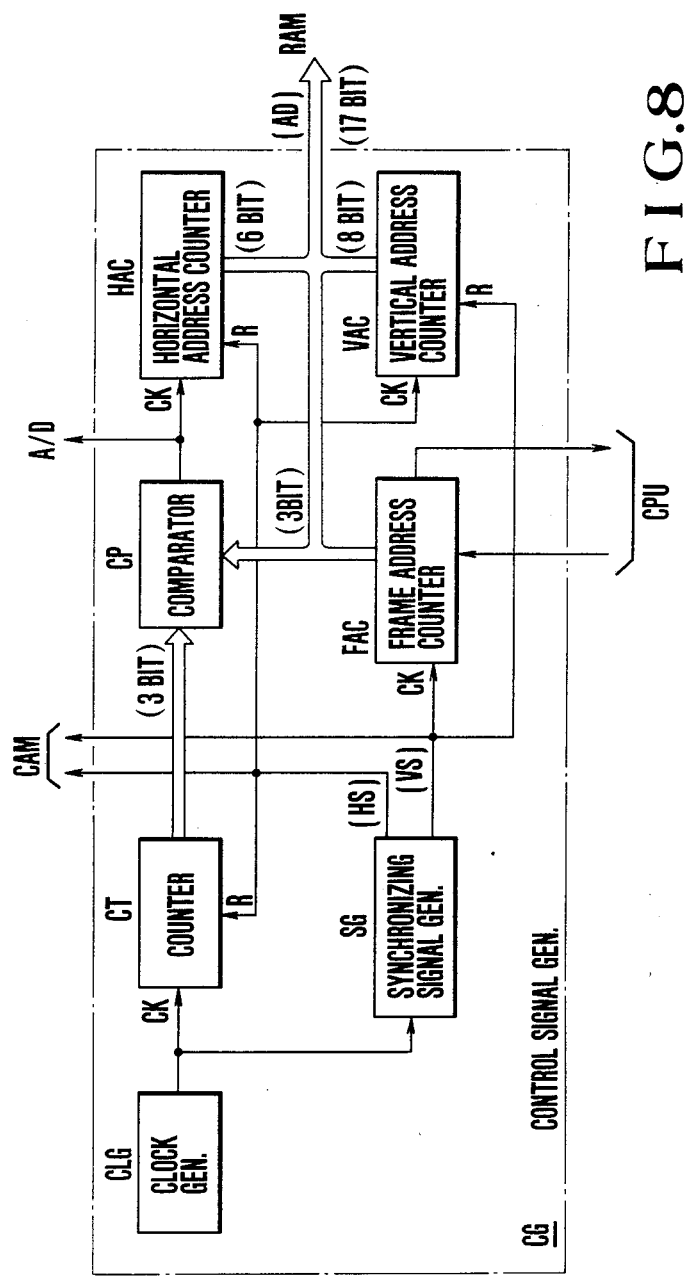
FIG. 8 is a block diagram showing a control signal generator.

The control signal generator CG shown in FIG. 8 comprises a clock generator CLG, a synchronizing signal generator SG generating a horizontal synchronizing signal HS and a vertical synchronizing signal VS, and a 3 bit counter CT corresponding to the number of the horizontal elements of each group of the solid state photoelectric converting element shown in FIG. 4A (and dividing the frequency of the clock pulse generated by the clock generator CLG). The counter CT counts the number of the clock pulses from the clock generator CLG to produce logical count outputs "0, 0, 0" through "1, 1, 1" which are applied to a comparator CP.

After being reset by the horizontal synchronizing signal HS, the counter CT begins a new counting operation.

A 3 bit frame address counter FAC is provided to count the number of the vertical synchronizing signals VS to produce count outputs "0, 0, 0" through "1, 1, 1" which are applied to the comparator CP. When both input signals to the comparator CP coincide with each other a coincidence signal is sent to a horizontal address counter HAC and to the A/D converter shown in FIG. 5.

The frame address counter FAC is reset by a start signal from the processor CPU to commence a new counting operation and when the outputs becomes a full count "1, 1, 1" it sends a termination signal to the processor CPU.

For this reason, the solid state photoelectric converting elements of the camera CAM shown in FIG. 4a are scanned in the row direction in accordance with the horizontal synchronizing signal HS so that by taking a period in which all elements are scanned as one frame, the frame is repeated in accordance with the vertical synchronizing signal so that image signals from respective solid state photoelectric converting elements are derived out in the same manner as in a standard television system and applied to the A/D converter via the waveform compensator.

The sampling operation of the A/D converter is controlled by the output from the comparator CP. Thus, when the 3 bit frame address counter FAC counts the first frame, the counter output becomes "0, 0, 0" so that each time the output of the counter CT becomes "0, 0, 0", the comparator produces an output. Accordingly, in the first frame only the image signals of the solid state photoelectric converting elements bounded by circles in FIG. 4a are sampled and converted by the A/D converter into digital signals.

In the second frame, since the output of the frame address counter FAC becomes "0, 0, 1", each time the output of the counter CT becomes "0, 0, 1" the comparator CP produces an output so that only the image signals from the solid state photoelectric converting elements on the right to the column of the elements bounded by circles are converted into digital signals. In the same manner, in the third to eighth columns, the image signals are sequentially converted into digital signals by the A/D converter.

Although the solid state photoelectric converting element groups shown in FIG. 4A are scanned in the horizontal direction in the same manner as the standard television system, the response speed of the A/D converter that converts the image signals into digital signals may be low so that during scanning of 8 frames, the solid state photoelectric converting elements in each row are scanned at each 8th element so that all elements are scanned during 8 frames.

According to the response speed of the A/D converter, it may continuously convert the image signals into digital signals.

There are also provided a horizontal address counter HAC reset by the horizontal synchronizing signal HS for counting the number of the outputs of the comparator CP, and a vertical address counter VAC reset by the vertical synchronizing signal VS for counting the number of the horizontal synchronizing signal. In this example, the horizontal address counter HAC produces a 6 bit output, while the vertical address counter VAC produces a 8 bit output, and a 17 bit address designation signal is synthesized by using the 3 bit output of the frame address counter FAC as lower order bits, the output of the horizontal address counter HAC as intermediate order bits, and the output of the vertical address counter VAC as the upper order bits. This address designation signal AD is applied to the RAM so that the output of the A/D converter is stored in the RAM as the measured values according to the arrangement shown in FIG. 4A.

As shown in FIG. 5, the measured values stored in the RAM are read out on a data bus DB in accordance with an address designation signal sent over an address bus AB from the processor CPU and the image areas of respective zones $Z_1$ to $Z_8$ obtained by dividing the image bearing surface 15 are obtained by the arithmetic operation of the processor based on the read out measured values.

Figure 9:
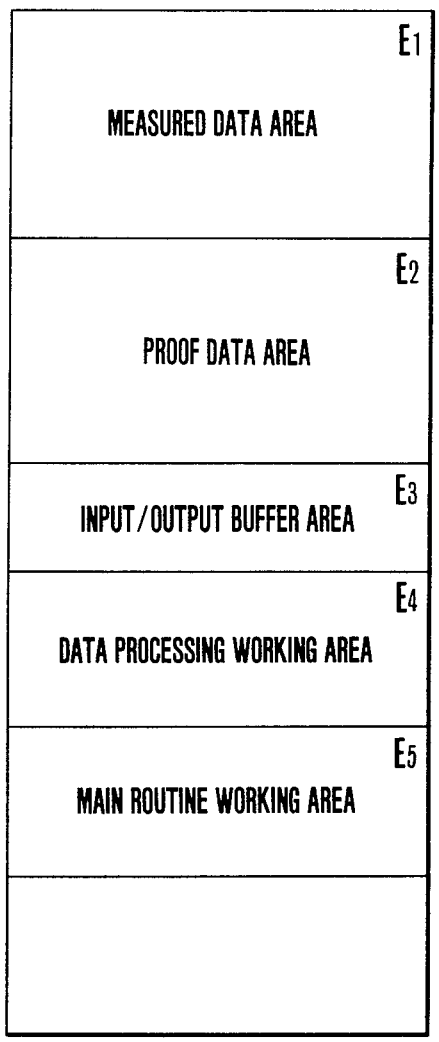
FIG. 9(A) shows the content of a random access memory device (RAM)
FIG. 9(B) shows the content of a read only memory device (ROM)
Figure 9:
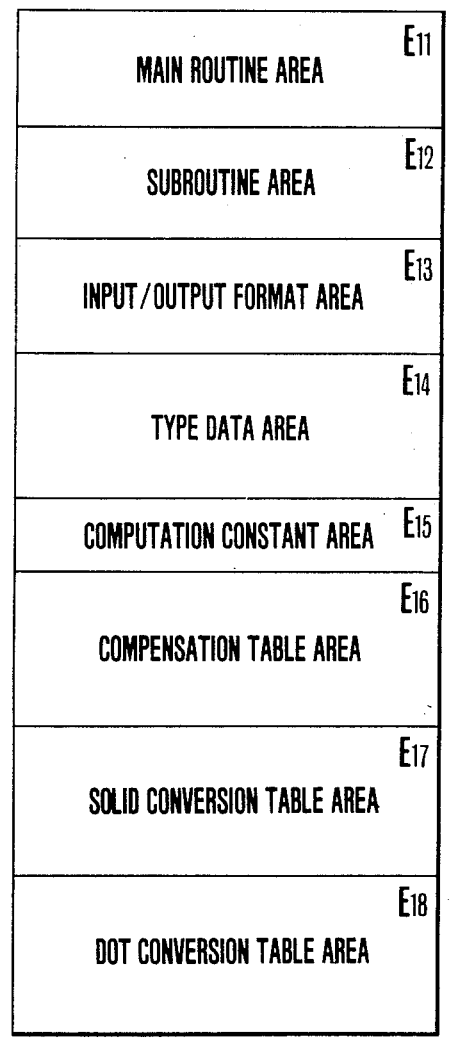

FIGS. 9A and 9B show the contents of the RAM and ROM respectively. The RAM comprises a measured data area $E_1$ for storing the measured values, a proof data area $E_2$ for storing proofed values, an input/output buffer area $E_3$ for temporarily storing inputs and ouputs, a data processing working area $E_4$ for temporarily storing data necessary for processing data, and a main routine working area $E_5$ for temporarily storing data necessary for executing a main routine.

The ROM comprises a main routine area $E_{11}$ for storing the main routine, a subroutine area $E_{12}$ for storing a subroutine area, an input/output format area $E_{13}$ for storing data that determines the input/output format, a type data area $E_{14}$ for storing various types of the lithographic printing plate such as dimensions L, H, S and l and number of divided zones $Z_1$ to $Z_8$ shown in FIG. 4B, a computation constant area $E_{15}$ for storing various computation constants, a compensation table area $E_{16}$ for storing a compensation table utilized for correcting nonuniform brightness by using a proof plate of a uniform reflectivity, a solid conversion table area $E_{17}$ for storing a solid conversion table utilized to convert an area ratio into the ink quantity to be supplied, and a dot conversion table area $E_{18}$ for storing a dot conversion table utilized for the same purpose.

Figures 10, 11:
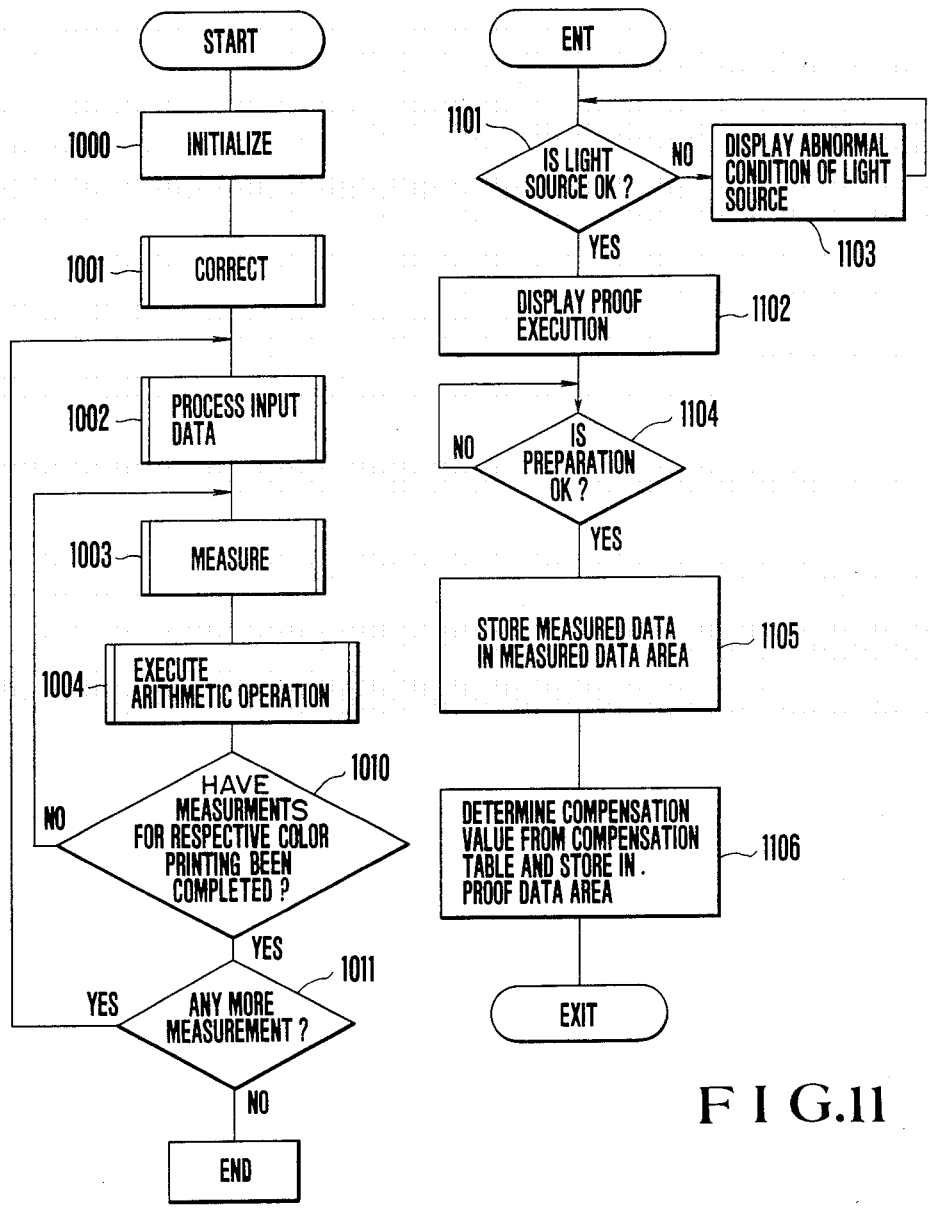
FIG. 10 shows an overall flow chart showing the processor control and the arithmetic operation.
FIG. 11 is a flow chart showing the detail of the proof.

FIG. 10 shows an overall flow chart showing the control and arithmetic operation executed by the processor CPU. According to this flow chart after a step labelled "START" at which a source switch is closed, various portions are initialized at a step 1000 and then at a step 1001 the nonuniform brightness is corrected with a correction plate having a uniform light reflective index instead of the lithographic printing plate.

After mounting the lithographic printing plate 3 the keyboard KB or switch group SW is used to give dimensions L, H, S and l and the number of divided zones $Z_1$ to $Z_8$ shown in FIG. 4B at a step 1002 labelled "process input data". Then the measurements are made at a step 1003 by the circuit shown in FIG. 5 in a manner described above and the arithmetical operation to be described hereinafter is executed at a step 1004. The identical operation is repeatedly executed for the lithographic printing plates 3 for different colors until the result of judgement at a step 1010 labelled "Have measurements for respective color printing been completed?" becomes YES.

Where the lithographic printing plates 3 unitlized for different colors are sequentially measured, the result (step 1011) of judgement labelled "Anymore measurement?" becomes YES and the steps 1002 to 1010 following the step 1011 are repeated, whereas when the result is NO, a series of operations terminates.

FIG. 11 is a flow chart showing the detail of the proof. At a step 1101 labelled "Is light source OK?", whether the light source 5 has been lighted or not is checked, and when the result of the check is YES, at a step 1102 labelled "display proof execution", the state is displayed on the cathode ray tube CRT, and a proof plate having a uniform reflectivity is mounted instead of the lithographic printing plate. When the result of the check is NO, an abnormal light source is driven at a step 1103 and an abnormal condition of the light source is displayed and then the process is returned to the step 1101. When the result of judgement executed at a step 1104 labelled "Is preparation OK?" is YES, the proof plate is photographed by the camera CAM and measured values are determined by the circuit shown in FIG. 5. The measured values are stored in the measured data area $E_1$ of RAM at a step 1105 labelled "Store measured data in measured data area". Then according to the content of RAM, a step 1106 labelled "Determine compensation value from compensation table and store them in the compensation data area $E_2$" is executed.

Figures 12, 13:
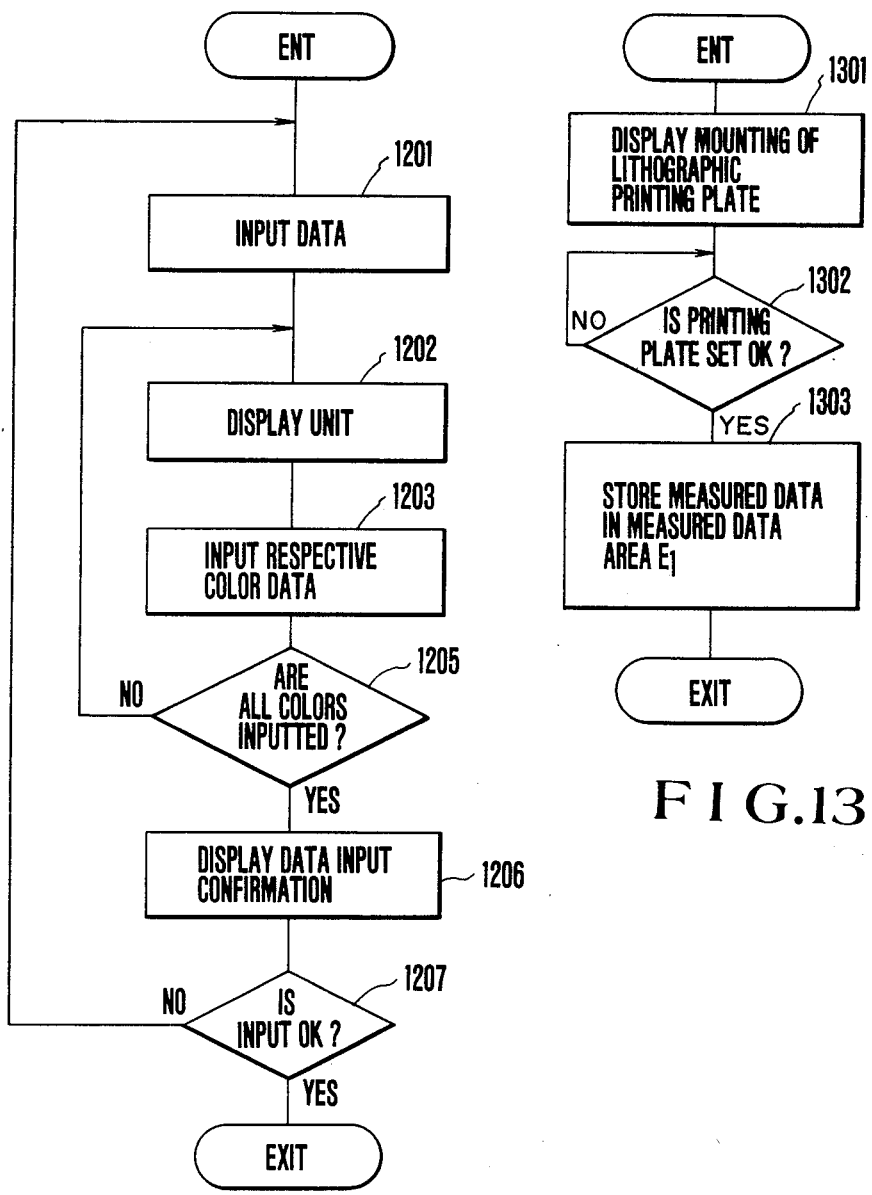
FIG. 12 is a flow chart showing the detail of the data input processing.
FIG. 13 is a flow chart showing the detail of the measurement.

FIG. 12 is a flow chart showing the detail of the data input processing. Thus, at a step 1201 labelled "Input data" a lithographic printing plate 3 is mounted and then dimensions L, H, S and l and the number of the divided zones $Z_1$ to $Z_3$ are given. At a step 1202 labelled "Display unit" these contents are displayed on the cathode ray tube CRT. At a step 1203 labelled "Input respective color data" the types of the colors of the lithographic printing plate 3 are inputted from the switch group SW or keyboard KB. Then at a step 1205 labelled "Are all colors inputted?", whether the lithographic printing plates of all colors have been successively mounted or not is judged. When the result of this judgement is NO, the step 1202 and the succeeding step 1203, are repeated until the result of judgement becomes YES. Then at a step 1206 labelled "Display data input confirmation", the input data for respective colors are displayed by the cathode ray tube CRT. When the display is confirmed by an operator, the operator operates a CR key of the switch group SW to render the result of judgement "Is input OK?" a step 1207 to be YES.

FIG. 13 is a flow chart showing the detail of the mesurement. At a step 1301 labelled "Display mounting of lithographic printing plate", the fact that a lithographic printing plate has been normally mounted or not is displayed on the cathode ray tube CRT. Then whether the lid 2 is completely closed or not is checked by a door switch, not shown. When the lid is completely closed, the result of judgement of a step 1302 labelled "Is printing plate set OK?" becomes YES and at a step 1303 labelled "Store measured data in measured data area $E_1$" the measured data of the lithographic printing plate 3 are stored in the data area $E_1$ of RAM.

Figure 14:
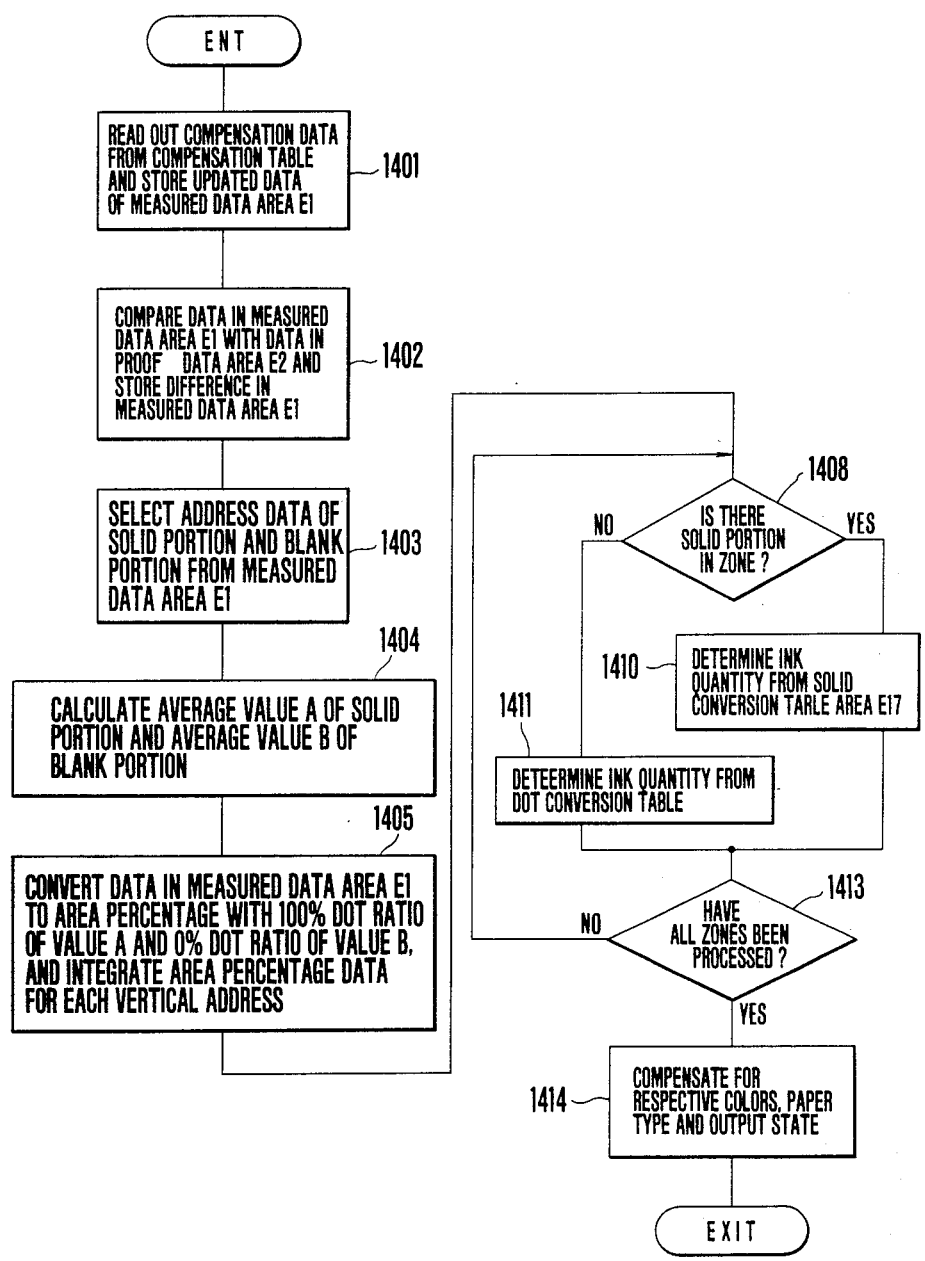
FIG. 14 is a flow chart showing the detail of the arithmetic operation.

FIG. 14 is a flow chart showing the detail of the arithmetic operation. At first step 1401, compensation data are readout from the compensation table and the content of the measured data area $E_1$ of the RAM is updated. Then at a step 1402, data in the measured data area $E_1$ is compared with the data in the proofed data area $E_2$ and the difference is stored in the measured data area $E_1$ of the RAM and thus the measured value for the lithographic printing plate 3 is corrected.

Then address data of the solid and blank portions 16 and 17 from the measured data area $E_1$ are selected at a step 1403 to obtain data which respectively correspond to the solid and blank portions 16 and 17. At a step 1404, an average value A of the solid portion 16 and an average value B of the blank portion 17 are calculated. At a step 1405, the data in the measured data area $E_1$ are converted to area percentages in accordance with an assumption that the value A is given as 100% dot ratio and the value B is given as 0% dot ratio. The area percentage data are integrated in units of vertical addresses corresponding to columns of solid state photoelectric converting elements for each one of the zones $Z_1$ to $Z_8$.

Then at a step 1408 a judgement is made as to whether each one of the zones $Z_1$ to $Z_8$ contains a solid portion or not and when the result of judgement is YES, a step 1410 is executed and the quantity of ink to be supplied is determined from the solid conversion table in the solid conversion table area $E_{17}$ in the ROM. Whereas when the result of judgement is NO, a step 1411 is executed and the quantity of ink to be supplied is determined from the dot conversion table in the dot conversion table area $E_{18}$ of the ROM.

The steps described above are repeated so long as all zones are not yet processed. When the result of judgement is YES at a step 1413, a step 1414 is executed and the ink quantity is multiplied with a coefficient read out from the computation constant area $E_{15}$ for executing compensations for colors, sheets of paper and output states.

Ultimately, the quantity of ink is determined by the degree of opening of an ink fountain key that determines the quantity of ink supplied to the inking rollers of the printing press and a signal corresponding to the ink quantity is sent to be recorded on a magnetic card or to be printed out by the printer PT. The ink quantity is also displayed on the cathode ray tube CRT.

FIG. 15 shows the characteristics of a compensation table stored in the compensation table area $E_{16}$ of the ROM which is depicted as a logarithmic curve. The proof value and the compensation value are determined from the compensation table having the characteristics shown in FIG. 15 in accordance with the measured value from the proof plate and the measured value from the lithographic printing plate 3. A correct measurement result can be obtained from the difference of the proof value and the compensation value.

More particularly, let us denote the light reflectivity at the solid portion by $R_{100}$ and that at 0% dot ratio by $R_0$. Since the quantity of the reflected light is proportional to the quantity of light emitted from the light source 5, where the area of the printing plate containing only a solid portion and the area of the printing plate containing only a 0% dot ratio portion are expressed by A, the ratio a between measured values at the same brightness becomes constant and can be shown by the following equation.

$$A \cdot R_0 / A \cdot R_{100} = R_0 / R_{100} = a \quad (1)$$

Where $x = a^y$, equation (1) becomes

-continued $$Y = \frac{\log x}{\log a} \quad (2)$$

When a measured value $a^n$ is obtained by irradiating a lithographic printing plate containing only a solid portion, since $R_0 = R_{100} a$, the measured value of a lithographic printing plate of 0% dot ratio is $a^{n+1}$ so that the following equation holds $$\begin{aligned} y_0 - y_{100} &= \frac{\log x_0}{\log a} - \frac{\log x_{100}}{\log a} \quad (3) \\ &= \frac{\log a^{n+1} - \log a^n}{\log a} \\ &= \frac{\log a^n + \log a - \log a^n}{\log a} \\ &= 1 \end{aligned}$$

where $y_0$ and $x_0$ are data of a lithographic printing plate containing only 0% dot data and $y_{100}$ and $x_{100}$ are data of a lithographic printing plate containing only the solid portion.

For this reason, for any degree of brightness, the measured value at the solid portion and the measured value at a portion of 0% dot ratio are determined from the characteristic curve shown in FIG. 15. A correct value under nonuniform brightness can be determined from the difference between these measured values.

The compensation table can be prepared from the equation described above, but it can be prepared by preparing two test plates having slightly different reflectivity, varying the quantity of the irradiated light and then plotting the measured values of the reflected light quantities.

FIG. 16 shows characteristics of the conversion tables stored in the conversion table areas $E_{17}$ and $E_{18}$, in which curve A corresponds to the solid conversion table, and curve B corresponds to the dot conversion table. In FIG. 16, the abscissa represents the integrated area percentage $\alpha$ corresponding to the image areas of respective zones $Z_1$ to $Z_8$, and the ordinate represents the degree of opening K of the ink fountain key.

At the time of printing, the quantity of ink is increased for the solid portion of the lithographic printing plate 3 to make clear the printed solid portion. For portions having low percentage of dot ratio other than the solid portion, the quantity of the ink is decreased, thus preventing oozing out of the ink. When the degree of opening of the ink fountain for each one of the zones $Z_1$ to $Z_8$ is adjusted according to the integrated area percentage and in accordance with the presence or absence of the solid portion, a satisfactory printing can be obtained through the experimental characteristic shown in FIG. 15.

It will be clear that the characteristic shown in FIG. 16 varies depending upon the type of the printing press and various printing conditions so that an optimum characteristic should be selected according to conditions.

The constructions shown in FIGS. 3, 5 and 8 may be changed so long as the desired performances can be provided. Furthermore, the number of the solid state photoelectric converting element groups, the manner of mounting the lithographic printing plate, and the number of divided zones $Z_1$ to $Z_8$ can be suitably selected.

Some of the steps of the flow charts shown in FIGS. 10 through 14 may be omitted or the order of the steps may be altered.

As is apparent from the embodiment described above, the area percentage measurement is performed on the basis of the solid and blank portions formed in the margin of the printing plate. An error caused by a nonuniform surface density of the printing plate can be eliminated. An error of $-7\%$ occurred for the 100% area percentage and $+7\%$ for the 0% area percentage in conventional system. However, according to the present invention, an error of about $-2$ to $+4\%$ occurs for the 100% area percentage, and about $\pm 1\%$ for the 0% area percentage. As a result, the measuring precision can be greatly improved, so that a variety of image area measurements for different printing plates can be performed.

What is claimed is:

1. In an image area measuring apparatus of the type wherein an image bearing surface of a lithographic printing plate is divided into a plurality of zones and photographed with a television camera to produce an analog image signal which is converted into a digital signal to obtain a measured value, the image area of each zone is calculated based on the measured value and a quantity of printing ink supplied at the time of printing to said lithographic printing plate is determined according to said image area, a method of measuring an image area of said lithographic printing plate, comprising the steps of:

forming a solid portion and a blank portion in a margin defining the image bearing surface of said lithographic printing plate, wherein said solid portion is formed in any part of a lateral lower portion of said margin, and said blank portion is formed in a left half of the lateral lower portion of said margin which corresponds to half of said image bearing surface, and wherein said solid and blank portions correspond to portions having 100% and 0% dot ratios, respectively;

defining a first average value of electrical signals obtained from said solid portion to be a first reference value for the 100% dot ratio, and a second average value of electrical signals obtained from said blank portion to be a second reference value for the 0% dot ratio; and coverting electrical signals from said image bearing surface to area percentage data in accordance with the first and second reference values.

2. A method according to claim 1, wherein one of said solid and blank portions is formed in an upper lateral portion of said margin, and the other of said solid and blank portions is formed in a lower lateral portion within an area to be actually photographed.

3. A method according to claim 1, wherein said blank portion is formed in one of upper and lower lateral portions of said margin so as to correspond to a full width of said image bearing surface.

* * * * *

UNITED STATES PATENT AND TRADEMARK OFFICE
CERTIFICATE OF CORRECTION

PATENT NO. : 4,564,860

DATED : 1/14/86

INVENTOR(S) : OHTA

It is certified that error appears in the above-identified patent and that said Letters Patent is hereby corrected as shown below:

| COLUMN | LINE | DESCRIPTION |
|---|---|---|
| 5 | 22 | delete "t" insert --$\underline{t}$-- |
| 5 | 55 | delete "t" insert --$\underline{t}$-- |

Signed and Sealed this

Ninth Day of August, 1988

Attest:

DONALD J. QUIGG

*Attesting Officer*     *Commissioner of Patents and Trademarks*